Figure 1:
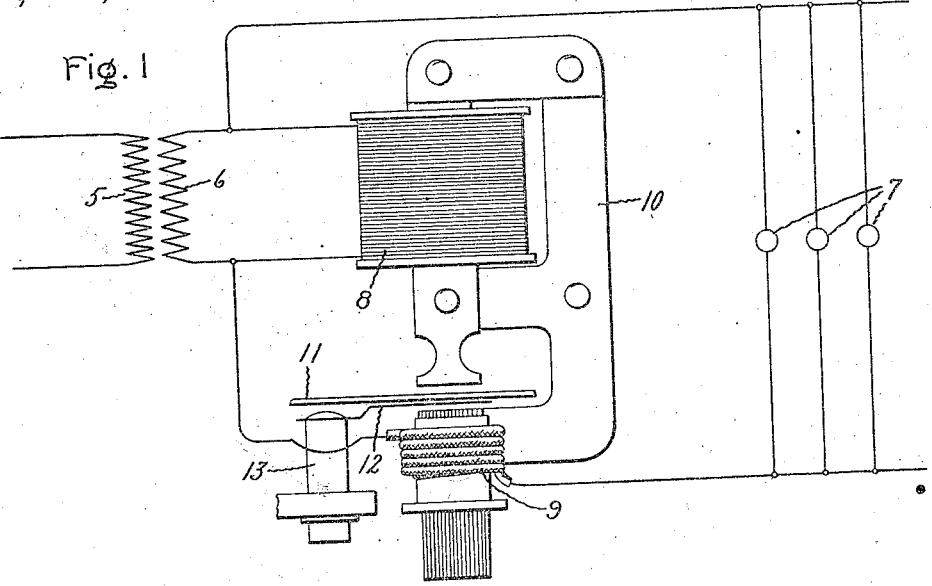

E. EVANS.
METERING DEVICE FOR ELECTRICAL DISTRIBUTING APPARATUS.
APPLICATION FILED FEB. 10, 1914.

1,218,538.                                                    Patented Mar. 6, 1917.

Witnesses
M. J. Youmans
J. Ellis Glen

Inventor:
Evan Evans
by
His Attorney

UNITED STATES PATENT OFFICE.

EVAN EVANS, OF BERLIN, GERMANY, ASSIGNOR TO GENERAL ELECTRIC COMPANY, A CORPORATION OF NEW YORK.

METERING DEVICE FOR ELECTRICAL DISTRIBUTING APPARATUS.

1,218,538.

Specification of Letters Patent.

Patented Mar. 6, 1917.

Application filed February 10, 1914. Serial No. 817,787.

*To all whom it may concern:*

Be it known that I, EVAN EVANS, a subject of the Emperor of Germany, residing at Berlin, Germany, have invented certain new and useful Improvements in Metering Devices for Electrical Distributing Apparatus, of which the following is a specification.

My invention relates to means for metering the electric energy supplied to an electrical distributing apparatus, and more particularly to a metering device adapted to be operatively connected to the distributing side of such apparatus. My invention is particularly adapted to be employed in connection with a transformer in cases where it is desirable to connect the meter to the secondary winding of the transformer and to register the total amount of electric energy supplied to the primary winding under all conditions of load.

The object of my invention is to provide a novel and improved metering means for electrical distributing apparatus. More particularly the object of my invention is to provide a metering means which will register the total electric energy supplied to such apparatus under any and all conditions of load. In its application to a transformer the object of my invention is to provide an electric meter operatively connected to the secondary winding for registering the total electric energy supplied to the transformer at any and all times, whether the transformer is loaded or not.

It is often advantageous to measure the electric energy supplied to an electrical distributing apparatus, such as a transformer, on the distributing or secondary side. In the case of a transformer where the energy consumption is measured on the secondary side voltage transformers are dispensed with in the first place, and in the second place any switchboard transformers which may be necessary are cheap, since they need be insulated only for the secondary voltage. In such a method of metering, however, the no-load consumption of the apparatus is not included in the metering. In order to make allowance for this no-load loss, I propose to give to the meter a supplementary torque which corresponds to the primary no-load consumption. This result can be accomplished in different ways, and I have herein described and illustrated one arrangement of apparatus adapted to satisfactorily carry out my invention.

Figure 2:
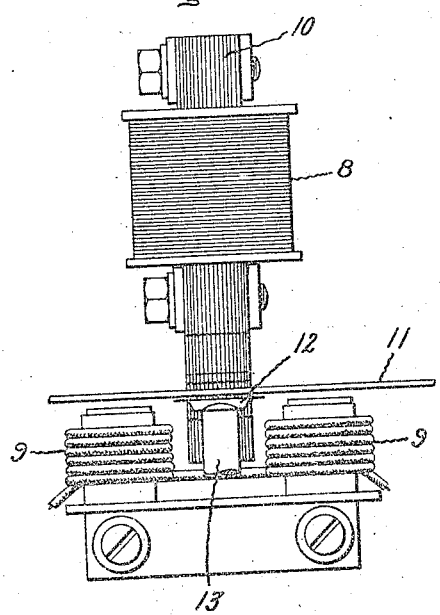

The features of my invention which I consider patentably novel are definitely indicated in the claims appended hereto. The details of arrangement and mode of operation of a satisfactory embodiment of my invention will be understood from the following description taken in connection with the accompanying drawings, in which:

Figure 1 is a diagrammatic view illustrating the application of my invention to a transformer, and Fig. 2 is an elevation of the motive elements of the electric meter shown in Fig. 1.

In carrying out my present invention, in its application to a transformer, I operatively connect an electric meter to the secondary winding of the transformer, and subject the rotatable element of the meter to a constant supplementary torque which is substantially proportional to the no-load losses of the transformer. The rotatable element of the meter is thereby rotated, when the transformer is not loaded, at a rate which is substantially a measure of the no-load losses of the transformer, while when the transformer is carrying a load the rate of rotation of the movable element is substantially proportional to the sum of the no-load losses and the energy distributed to the translating devices. In the embodiment of my invention herein illustrated the supplementary torque is produced by giving to the rotatable element of the meter a no-load voltage movement of a magnitude proportional to the no-load losses of the transformer.

Referring to Fig. 1 of the drawings there is diagrammatically illustrated a transformer having a primary winding 5 and a secondary winding 6 distributing energy to translating devices 7. An electric meter is operatively connected to the secondary winding of the transformer in such a way that it is adapted to register the total energy supplied to the transformer under any and all conditions of load. The electric meter comprises a potential coil 8 and series coils 9 suitably arranged on laminated magnetic material 10 which is adapted to form a path for the potential and series magnetic fluxes.

The rotatable element of the meter consists of a disk 11 of aluminum or other suitable conducting material. The disk 11 is rotatably arranged in the well known manner, in an air gap in both the potential and series magnetic circuits. A sheet metal vane 12, preferably of copper or aluminum, extends into the air gap with the disk armature 11 in a plane parallel with the plane of the armature. The vane 12 is pivoted to a fixed post 13, and its position in the air gap is adapted to be varied by moving the vane about the post as an axis.

When the vane 12 occupies the position represented in Fig. 2 of the drawings it is symmetrically arranged with respect to the middle line of the driving system of the meter, and, accordingly, exerts no influence of any sort upon the operation of the meter. If, however, the vane is turned out of this symmetrical position to the right or left there arises two voltage fields which are mutually displaced in space and time and which pass through the armature disk 11 and produce rotation thereof. The action of the sheet metal vane on the meter, and, accordingly, the speed of rotation of the disk 11, varies in accordance with the magnitude of the angle by which the vane is moved from a symmetrical position. By suitably moving the vane any predetermined or desired torque may be established with nice exactness. In accordance with the principle of my invention the sheet metal vane 12 is adjusted until the speed of rotation of the rotatable element of the meter, when the transformer is unloaded, is substantially a measure of the transformer no-load losses.

The operation of my improved metering device will, it is believed, be fully understood from the foregoing description. The rotatable element of the meter is subjected to a torque having two components each tending to turn the element in the same direction. One component of the torque is predetermined by the adjustment of the vane 12 and is substantially proportional to the no-load losses of the transformer, while the other component of the torque is substantially proportional to the energy distributed to the translating devices of the installation. When the translating devices are consuming no energy the second component of the meter torque is zero, and the revolutions of the rotatable element of the meter are then proportional to the no-load losses of the transformer. It will, therefore, be evident that the no-load energy consumption of the transformer is continuously added to the energy distributed by the transformer and registered. If no energy is being distributed the no load-losses alone are registered.

It will be seen from the foregoing description that I have provided a metering device which is adapted to be connected to the distributing side of an electrical distributing apparatus for accurately registering the total electric energy supplied to such apparatus. In addition to the advantages heretofore mentioned my improved device possesses the further advantage that the rotatable element of the meter is continuously in movement, and, accordingly, the smallest load which is thrown on the transformer is measured. It is well known that in standard meters an indication of the consumption of energy begins at about 1% of the full load, due to the inability of the torque produced by a very small load to overcome the inertia of the moving element of the meter. By the use of my invention it is now no longer necessary, in cases where even the smallest consumption of energy is to be measured, to utilize the complicated pendulum meter, since the same results can be accurately secured with a simple and reliable motor meter embodying the features of my invention.

While I have described herein one arrangement of apparatus for carrying out my invention it will be understood that I do not desire to be limited thereto. Numerous devices and expedients for imparting to the rotatable element of an electric meter a supplementary torque substantially proportional to a predetermined quantity will be evident to those skilled in the art, and it will, therefore, be understood that I have herein described a specific means for obtaining this supplementary torque merely for the purposes of illustration. I, accordingly, aim in the appended claims to cover all modifications of my invention obvious to those skilled in the art and within its spirit and scope as herein defined.

What I claim as new and desire to secure by Letters Patent of the United States is:—

1. The combination with an electrical energy distributing apparatus of an electric meter operatively connected to the distributing side of the apparatus and having a rotatable element, means whereby said element is subjected to a torque having two components, one of the components of said torque being substantially proportional to the no-load losses of said apparatus and the other component of said torque being substantially proportional to the energy distributed by said apparatus.

2. The combination with an electrical energy distributing apparatus of an electric meter operatively connected to the distributing side of the apparatus and having a rotatable element, means for producing a constant torque substantially proportional to the no-load losses of said apparatus and tending to turn said element, and means whereby the torque tending to turn said element is increased substantially in proportion to the energy distributed when the apparatus carries a load.

3. The combination with an electrical energy distributing apparatus of an electric meter operatively connected to the distributing side of the apparatus and having a rotatable element, means for imparting to said element a continuous rotation of such amount that the revolutions of the element are substantially proportional to the no-load losses of the apparatus, and means whereby the speed of rotation of said element is increased when the apparatus is distributing energy so that the revolutions of the element under such conditions are substantially proportional to the sum of the no-load losses of the apparatus and the energy distributed.

4. The combination with the secondary winding of a transformer of an electric meter connected thereto and comprising a rotatable element, and means for producing a torque having two components each tending to turn said element in the same direction, one component of said torque being constant and substantially proportional to the no-load losses of the transformer and the other component of said torque being substantially proportional to the load upon the transformer secondary.

5. The combination with the secondary winding of a transformer of an electric meter connected thereto and comprising a rotatable element, a torque producing means adapted to continuously rotate said element at a speed which is substantially a measure of the no-load losses of the transformer, and means whereby said torque is increased when the secondary winding is distributing energy so that the speed of rotation of the element under such conditions is substantially a measure of the sum of the no-load losses of the transformer and the energy distributed.

6. A system of electrical distribution comprising in combination a high tension supply system, a low tension distributing system, electrical means for transferring electric energy from said high tension supply system to said low tension distributing system, an electric meter operatively included in said low tension distributing system and having a rotatable element, and torque-producing means acting upon the rotatable element of said meter whereby the element is rotated at a speed which is a measure of the sum of the no-load losses of said electrical means and of the energy consumed in said low tension distributing system.

In witness whereof, I have hereunto set my hand this 19th day of January 1914.

EVAN EVANS.

Witnesses:
 WOLDEMAR HAUPT,
 HENRY HASPER.